(12) United States Patent
Shekhar et al.

(10) Patent No.: US 10,680,673 B2
(45) Date of Patent: Jun. 9, 2020

(54) INTEGRATED CIRCUIT FOR SELF-INTERFERENCE CANCELLATION AND METHOD OF PERFORMING FULL-DUPLEX RADIO COMMUNICATION

(71) Applicant: Intel Corporation, Santa Clara, CA (US)

(72) Inventors: Sudip Shekhar, Woodinville, WA (US); Ahmed El Sayed, Vancouver (CA)

(73) Assignee: INTEL CORPORATION, Santa Clara, CA (US)

( * ) Notice: Subject to any disclaimer, the term of this patent is extended or adjusted under 35 U.S.C. 154(b) by 52 days.

(21) Appl. No.: 15/778,647

(22) PCT Filed: Dec. 24, 2015

(86) PCT No.: PCT/US2015/000324
§ 371 (c)(1),
(2) Date: May 24, 2018

(87) PCT Pub. No.: WO2017/111799
PCT Pub. Date: Jun. 29, 2017

(65) Prior Publication Data
US 2018/0358997 A1 Dec. 13, 2018

(51) Int. Cl.
*H04B 1/56* (2006.01)
*H04B 1/525* (2015.01)
*H04B 1/10* (2006.01)

(52) U.S. Cl.
CPC ............... *H04B 1/56* (2013.01); *H04B 1/525* (2013.01); *H04B 1/1027* (2013.01)

(58) Field of Classification Search
CPC ......... H04B 1/56; H04B 1/1027; H04B 1/525
See application file for complete search history.

(56) References Cited

U.S. PATENT DOCUMENTS 6,104,673 A * 8/2000 Cole ................... G01S 7/52017
367/11
6,333,947 B1 12/2001 Van Heeswyk et al.
(Continued)

FOREIGN PATENT DOCUMENTS

| JP | 2015524212 A | 8/2015 |
|---|---|---|
| KR | 1020100021383 A | 2/2010 |
| WO | 2013185106 A1 | 12/2013 |

OTHER PUBLICATIONS

The extended European search report issued in the corresponding patent Application No. 15911502.1, dated Jun. 28, 2019, 9 Pages.
(Continued)

*Primary Examiner* — Jay P Patel
(74) *Attorney, Agent, or Firm* — Viering, Jentschura & Partner mbB (57) ABSTRACT

An electronic circuit for generating a delayed radio signal for use in a radio communication device configured to provide a transmit baseband signal in a baseband, to up-convert the transmit baseband signal into a transmit radio signal in a radio band, to transmit the transmit radio signal in the radio band, and to simultaneously receive a receive radio signal in the same radio band, is provided. The electronic circuit may include a delay circuit configured to delay a copy of the transmit baseband signal by an amount of time to generate a delayed baseband signal, an up-converting circuit configured to shift the frequency spectrum of the delayed baseband signal to the radio band to generate a delayed radio signal, and an output circuit configured to output the delayed radio signal for a cancellation circuit to cancel the delayed radio signal from the receive radio signal.

25 Claims, 5 Drawing Sheets

(56) References Cited

U.S. PATENT DOCUMENTS

| | | | |
|---|---|---|---|
| 8,422,540 B1* | 4/2013 | Negus | H04B 1/38 |
| | | | 370/210 |
| 8,948,235 B2* | 2/2015 | Negus | H04B 1/525 |
| | | | 375/219 |
| 2002/0013133 A1 | 1/2002 | Lam | |
| 2003/0090405 A1* | 5/2003 | Rauch | G01S 7/038 |
| | | | 342/21 |
| 2007/0116099 A1* | 5/2007 | Banister | H04B 1/71075 |
| | | | 375/148 |
| 2009/0168856 A1* | 7/2009 | Muhammad | H04B 1/525 |
| | | | 375/221 |
| 2011/0143655 A1 | 6/2011 | Ann et al. | |
| 2012/0115412 A1* | 5/2012 | Gainey | H04B 3/23 |
| | | | 455/7 |
| 2014/0140250 A1 | 5/2014 | Kim et al. | |
| 2015/0078217 A1 | 3/2015 | Choi et al. | |
| 2015/0156003 A1 | 6/2015 | Khandani | |
| 2015/0222398 A1* | 8/2015 | Ott | H04B 3/548 |
| | | | 370/430 |
| 2015/0263780 A1 | 9/2015 | Mehlman et al. | |
| 2017/0170999 A1* | 6/2017 | Zhou | H04L 25/08 |

OTHER PUBLICATIONS

International Search Report based on application No. PCT/US2015/000324 dated Sep. 9, 2016 (11 pages) (Reference Purpose Only).

* cited by examiner

INTEGRATED CIRCUIT FOR SELF-INTERFERENCE CANCELLATION AND METHOD OF PERFORMING FULL-DUPLEX RADIO COMMUNICATION

CROSS-REFERENCE TO RELATED APPLICATION

The present application is a national stage entry according to 35 U.S.C. § 371 of PCT application No.: PCT/US2015/000324 filed on Dec. 24, 2015, and is incorporated herein by reference in its entirety and for all purposes.

TECHNICAL FIELD

Various aspects of this disclosure relate generally to wireless communication technology.

BACKGROUND

Radio communication may take place between a communication device and a communication partner which may be a base station in a cellular communications network. Conventional designs for two-way communication include time-domain multiplexing and frequency-domain multiplexing, i.e. the transmission and the receipt of radio signals may take place either in different time frames or in different radio bands in order to avoid interference between the radio signals of the communication device and communication partner.

Using two different radio bands allows full-duplex communication, i.e. both communication partners may continuously transmit radio signals without causing signal interference. However, a most limited and valuable resource in radio communication is the spectral band used as a communication channel. Therefore, efforts have been made to simultaneously transmit and receive (STR) radio signals in the same frequency band. That approach has the potential of making double use of a given radio band but entails a technical challenge in that the (strong) radio signal transmitted by a communication device interferes with the (weak) radio signal received from a communication partner in the same frequency band.

In order to extract the radio signal originating from the communication partner, the self-interference caused by the own radio transmission of the communication device may be taken into account by the communication device receiving an overall radio signal in the frequency band shared by it and the communication partner. In a conventional attempt, the communication device may try to estimate or emulate or model the self-interfering signal and to subtract it from the received overall radio signal in the shared frequency band in order to obtain the radio signal emanating from the communication partner. That approach is referred to as self-interference cancellation (SIC).

Self-interference cancellation may be based on the fact that the communication device knows the radio signal that it is sending. That information may be used to purge the transmitted self-interfering radio signal from the received overall radio signal. However, the self-interfering radio signal may include at least one echo, i.e. the radio signal transmitted by the communication device may be reflected by some (unknown) object in the environment of the communication device. The interfering radio signal echo may return to the communication device with an (unknown) delay or phase shift. In order to take account of such a delayed self-interfering radio signal, the communication device may emulate a delayed radio signal component for the purpose of canceling it from the received overall radio signal.

Conventionally, a delayed radio signal component may be emulated in the communication device by guiding a copy of the radio signal through a delay line. However, as typical radio signal bands in mobile communication networks may be situated in a carrier frequency range from 2 GHz to 3 GHz (corresponding to wavelengths between 10 cm and 15 cm), delay lines tend to be excessively bulky with respect to spatial requirements of circuit integration and miniaturization with a view to building compact communication devices such as hand-held mobile devices.

SUMMARY

An electronic circuit for generating a delayed radio signal for use in a radio communication device, the radio communication device configured to provide a transmit baseband signal in a baseband, to up-convert the transmit baseband signal into a transmit radio signal in a radio band, to transmit the transmit radio signal in the radio band, and to simultaneously receive a receive radio signal in the same radio band, is provided. The electronic circuit may include a delay circuit configured to delay a copy of the transmit baseband signal by an amount of time to generate a delayed baseband signal, an up-converting circuit configured to shift the frequency spectrum of the delayed baseband signal to the radio band to generate a delayed radio signal, and an output circuit configured to output the delayed radio signal for a cancellation circuit to cancel the delayed radio signal from the receive radio signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The components of the communication device (e.g. the . . . ) may for example be implemented by one or more circuits. A "circuit" may be understood as any kind of a logic implementing entity, which may be special purpose circuitry or a processor executing software stored in a memory, firmware, or any combination thereof (e.g. an operating system). Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

For purposes of this description, radio communication technologies may be classified as one of a Short Range radio communication technology, Metropolitan Area System radio communication technology, or Cellular Wide Area radio communication technology (also referred to as Wireless Wide Area Network (WWAN) radio communication technology). Short Range radio communication technologies include Bluetooth, WLAN (Wireless Local Area Network) (e.g. according to any IEEE 802.11 standard or e.g. WiFi), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Universal Mobile Telecommunications System (UMTS), Long Term Evolution (LTE), LTE-Advanced (LTE-A), Code Division Multiple Access (CDMA), Wideband CDMA (WCDMA), General Packet Radio Service (GPRS), Enhanced Data Rates for GSM Evolution (EDGE), High Speed Packet Access (HSPA), HSPA Plus (HSPA+), and other similar radio communication technologies.

The term "network" as utilized herein, e.g. in reference to a communication network such as a mobile communication network, is intended to encompass both an access section of a network (e.g. a radio access network (RAN) section) and a core section of a network (e.g. a core network section).

Unless explicitly specified, the term "transmit" encompasses both direct and indirect transmission. Similarly, the term "receive" encompasses both direct and indirect reception unless explicitly specified.

In various aspects of this description, self-interference cancellation in a wireless communication device includes emulating at least one reflection path of the radio signal transmitted by the communication device and echoed to the communication device. To this end, at least one delayed copy of the transmitted radio signal may be generated and used in the cancellation process purging a self-interfering echo of the transmit signal of the communication device from the received overall radio signal.

According to an aspect of the present description, a delayed copy of the transmit radio signal may be generated by delaying a copy of the transmit baseband signal and up-converting the delayed baseband signal to the radio band to generate a delayed radio signal emulating a reflected transmit radio signal (echo signal). Therefore, the generated delayed radio signal may be used to cancel an echo of the transmit radio signal from the received overall radio signal so as to obtain the radio signal transmitted from a communication partner device such as a base station of a wireless communication network.

The copy of the transmit baseband signal may be provided by tapping a baseband circuit of transmit circuitry of the communication device. The delayed baseband signal may be up-converted by an up-converting circuit mimicking the up-conversion of the analog transmit circuitry of the communication device so as to reproduce any linear or non-linear impact of the transmit circuitry on the generation of the radio signal. For example, a non-linear impact may result in a distorted radio signal which may be undesired but may have to be regenerated in the emulation in order to cancel the corresponding distorted echo signal.

Alternatively, a copy of the transmit baseband signal may be provided by tapping the radio signal generated by the transmit circuitry of the communication device in the radio band and by down-converting the radio signal to the baseband. The alternative approach ensures that a true copy of the transmit radio signal, including any distortion or other imperfection caused by the transmit circuitry, is used to truly emulate an echo signal.

As the delaying operation is performed on the (transmit) baseband signal, it may be carried out by means of electronic elements that lend themselves to integration on a semiconductor chip. For example, the transmit baseband signal may be delayed by low-pass filtering. Low-pass filters may be implemented by circuits including resistors and capacitors. Time constants of low-pass filters may be made variable by using tunable capacitors and/or resistors. Second-order (or higher-order) low-pass filters may provide longer delay times than those achievable by first-order low-pass filters.

The amount of time by which the copy of the transmit baseband signal is delayed may be predetermined to emulate a specific delay or phase shift of an echo of the transmit radio signal of the communication device. Alternatively, the delay time applied by the electronic circuit may be variable and may be adjusted to a variable environment of the communication device entailing a variable reflection path. If the communication device is a mobile device, its reflective environment may change frequently and an optimum delay time for emulating a reflected self-interfering transmit radio signal may be (re-)determined automatically and periodically to achieve self-interference cancellation even in varying environments.

For amplitude modulated signals, the low frequency envelope delay to be achieved by the electronic circuit may reproduce the full travelling time of the radio echo. For the high frequency carrier portion of the signal, it may be sufficient to reproduce a phase shift between the transmitted radio signal and the echoed radio signal. In other words, an echo traveling time $E=nT+d$ (T=period of the radio signal; n=0, 1, 2, . . . ) may be reduced to implementing a partial delay d in the electronic circuit.

As a reflective environment may present a plurality of reflection paths, several echoes of the transmit radio signal may be reflected to the communication device. In order to cancel several echoes, the communication device may include a plurality of electronic circuits for generating several delayed radio signals having different delay times, i.e. for emulating several echoes having different travel times or phase shifts. That plurality of delayed radio signals may then be used in the cancellation process, i.e. they may be subtracted from the incoming overall radio signal in the radio band in order to extract the radio signal originating from a communication partner device transmitting in the same radio band. The delay times applied by the electronic circuits may be changed and optimized dynamically to take account of varying reflective environments in a mobile operation of the communication device so as to continuously cancel echo signals having varying travel times or phase shifts.

A plurality of non-exact delayed radio signals may be generated and combined (e.g. interpolated) to emulate one actual echo radio signal. This may be another benefit of using plural electronic circuits in parallel.

As the volume of an echo radio signal may depend on the reflection path, the electronic circuit may be configured to adjust the volume of a generated delayed radio signal emulating the echo signal. The volume adjustment may be implemented by including at least one attenuation element in the signal processing chain of the electronic circuit. The attenuation may be understood as a weighting factor. For example, if several radio echoes are emulated in parallel, different weighting factors may be applied to different delayed radio signals to take account of different volumes of the echo signals. The weightings may be changed and optimized dynamically to take account of varying reflective environments in a mobile operation of the communication device so as to continuously cancel echo signals having varying volumes.

Figure 1:
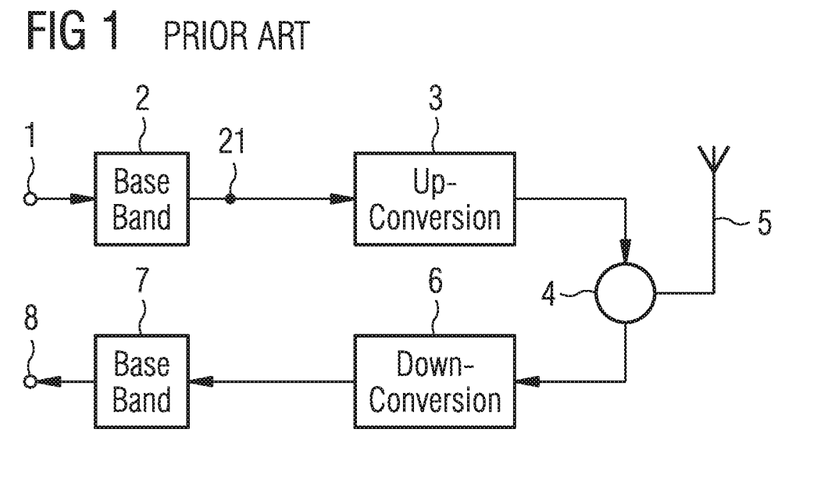
FIG. 1 shows a schematic block diagram of transmit and receive circuitry of a conventional radio communication device.

FIG. 1 is a schematic block diagram illustrating two fundamental processing chains of a conventional radio communication device. A transmit chain may include an input node 1, a baseband circuit 2, an up-converting stage (also referred to as up-converting circuit) 3, a transmit antenna 5, and a circulator 4 (in particular if antenna 5 is also used as a receive antenna). A receive chain may include a receive antenna, which may be identical to the transmit antenna 5, the circulator 4 (in particular if antenna 5 is also used as a transmit antenna), a down-converting stage (also referred to as down-converting circuit) 6, a baseband circuit 7, and an output node 8.

A data signal arriving at input node 1 may represent any information intended to be transmitted with a radio signal. Such a data signal may be processed (e.g. encoded) in any form in baseband circuit 2, i.e. at spectral baseband, to produce a transmit baseband signal (at a fictitious node 21) in preparation for the transmission. Up-converting stage 3 shifts the spectrum of the transmit baseband signal to a radio band. Up-converting stage 3 may perform up-conversion by mixing (e.g. multiplying) the transmit baseband signal with a sinusoidal signal representing a carrier frequency in the radio band. The up-converted baseband signal represents the transmit radio signal that may be guided to circulator 4 for transmission from antenna 5.

A radio signal received at an antenna such as antenna 5 may be guided to down-converting stage 6 via circulator 4 which may be used to separate the incoming radio signal and the outgoing radio signal if only one antenna is used. Down-converting stage 6 shifts the incoming radio signal from the radio band to baseband. Down-converting stage 6 may perform the down-conversion by mixing the incoming radio signal with a sinusoidal signal representing the carrier frequency in the radio band. The baseband version of the incoming radio signal may be processed (e.g. decoded) in baseband circuit 7 to deliver a data signal at output node 8 for further processing in the communication device.

The data signal at output node 8 is supposed to represent information that a communication counterpart intends to transmit to the communication device. However, while circulator 4 may keep the outgoing radio signal of the up-converting stage 3 (transmit radio signal) away from the incoming radio signal arriving at the down-converting stage 6, the circulator 4 cannot prevent that the incoming radio signal may include at least one echo of the outgoing or transmit radio signal of the communication device. There may also be a reflection from the circulator itself, due to non-idealities in the circulator. Such self-interferences may overpower the radio signal transmitted by a communication counterpart and, thus, may jam the receive channel.

Figure 2:
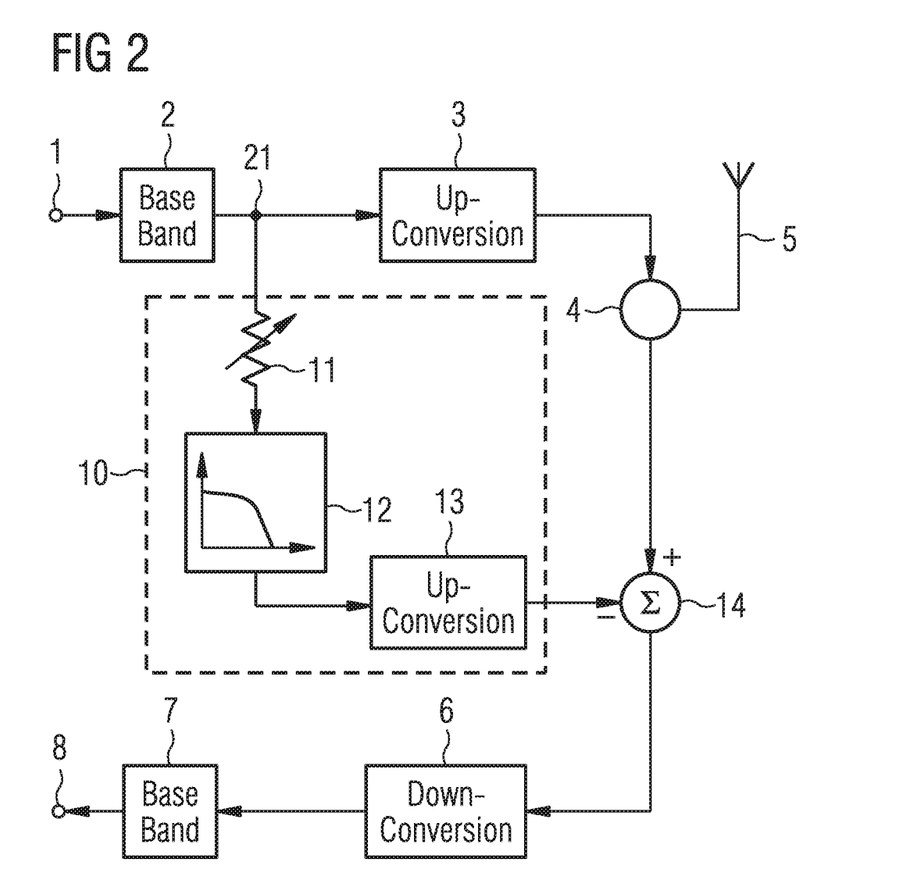
FIG. 2 shows a schematic block diagram of an exemplary radio communication device including an electronic circuit for emulating an echo radio signal that may be canceled from a received radio signal.

In order to cancel such self-interference caused by an echo of the transmit radio signal of the communication device, an electronic circuit 10 as shown in FIG. 2 may be provided in the communication device to emulate an echo radio signal and subtract the emulated echo radio signal from the radio signal received from antenna 5 or circulator 4.

The electronic circuit 10 may be configured to receive a copy of the transmit baseband signal emanating from baseband circuit 2 in the transmit chain of the communication device. The copy of the transmit baseband signal may be tapped from a node 21 between baseband circuit 2 and up-converting stage 3 in the transmit chain. An attenuator may be provided configured to attenuate a copy of the transmit baseband signal, e.g. a variable attenuator, which may be implemented by an (e.g. tunable) resistor 11 or other signal dividing component or circuit. The attenuated copy of the transmit baseband signal may then be processed in electronic circuit 10, as described below, and outputted to a cancellation stage 14. A different portion of the processing chain of electronic circuit 10 may include an attenuator in addition to, or in lieu of, the attenuator 11.

The electronic circuit 10 may delay the copy of the transmit baseband signal by an amount of time by low-pass filtering the copy of the transmit baseband signal. A low-pass filter 12 may include at least one capacitor and least one resistor, and at least one of those components may be tunable to vary a time constant of the low-pass filter implying a variable group delay of the filter. A second-order (or higher-order) low-pass filter including two (or more) capacitors may impose a greater delay than that achievable by a first-order low-pass filter including a single capacitor.

An up-converting stage 13 in the electronic circuit 10 may up-convert the output of the low-pass filter, i.e. the delayed copy of the transmit baseband signal, to the radio band in order to generate a delayed radio signal emulating an echo radio signal having a specific volume and a specific phase shift with respect to the transmit radio signal generated by up-converting stage 3. In an ideal scenario, the up-converting stages 3 and 13 may have congruent behaviors, including congruent linearity and/or non-linearity, so that the up-converting stage 13 may deliver an ideal delayed copy of the transmit radio signal. That copy may be subtracted from the received radio signal to cancel an echo radio signal from the received radio signal.

The cancellation stage 14 may be implemented as a subtracting node to subtract the emulated echo radio signal from the received radio signal arriving from antenna 5 via circulator 4, for example. Prior to subtraction, a weighting circuit may weigh the emulated echo radio signal by a (e.g. variable) factor to emulate the (potentially variable) volume of the echo radio signal.

The low-pass filter 12 may be implemented as a first-order low-pass filter including one capacitor and one resistor, or as a second (or higher) order low-pass filter including two (or more) capacitors and two (or more) resistors. The attenuator 11 and the low-pass filter 12 may be implemented by passive components that may process the copy of the transmit baseband signal without introducing distortions. As the self-interfering signal may have a large magnitude, high linearity may be a critical design constraint for any self-interference cancellation circuit.

Thus, the delayed radio signal outputted from up-converting stage 13 may be an ideal delayed copy of the transmit radio signal outputted from up-converting stage 3. Moreover, the components of electronic circuit 10 may lend themselves to monolithic integration on a semiconductor chip.

A second electronic circuit (not shown in FIG. 2) may be used in parallel to electronic circuit 10 and may have the same structure as electronic circuit 10 and may also process a copy of the transmit baseband signal tapped from node 21. However, the low-pass filter of the parallel electronic circuit may delay the copy of the transmit baseband signal by a different amount of time in order to emulate a second echo radio signal having a different phase shift with respect to the transmit radio signal. Thus, a second interfering echo radio signal may be canceled from the received radio signal. As the second echo radio signal may have a different volume, the second electronic circuit may apply a second weighting factor to the second emulated echo signal before the second emulated echo signal is subtracted from the received radio signal.

Two (or more) non-exact delayed radio signals may be generated and combined (e.g. interpolated) to emulate one actual echo radio signal. This may be another benefit of using a second (or further) electronic circuit in parallel to electronic circuit 10.

Figure 3:
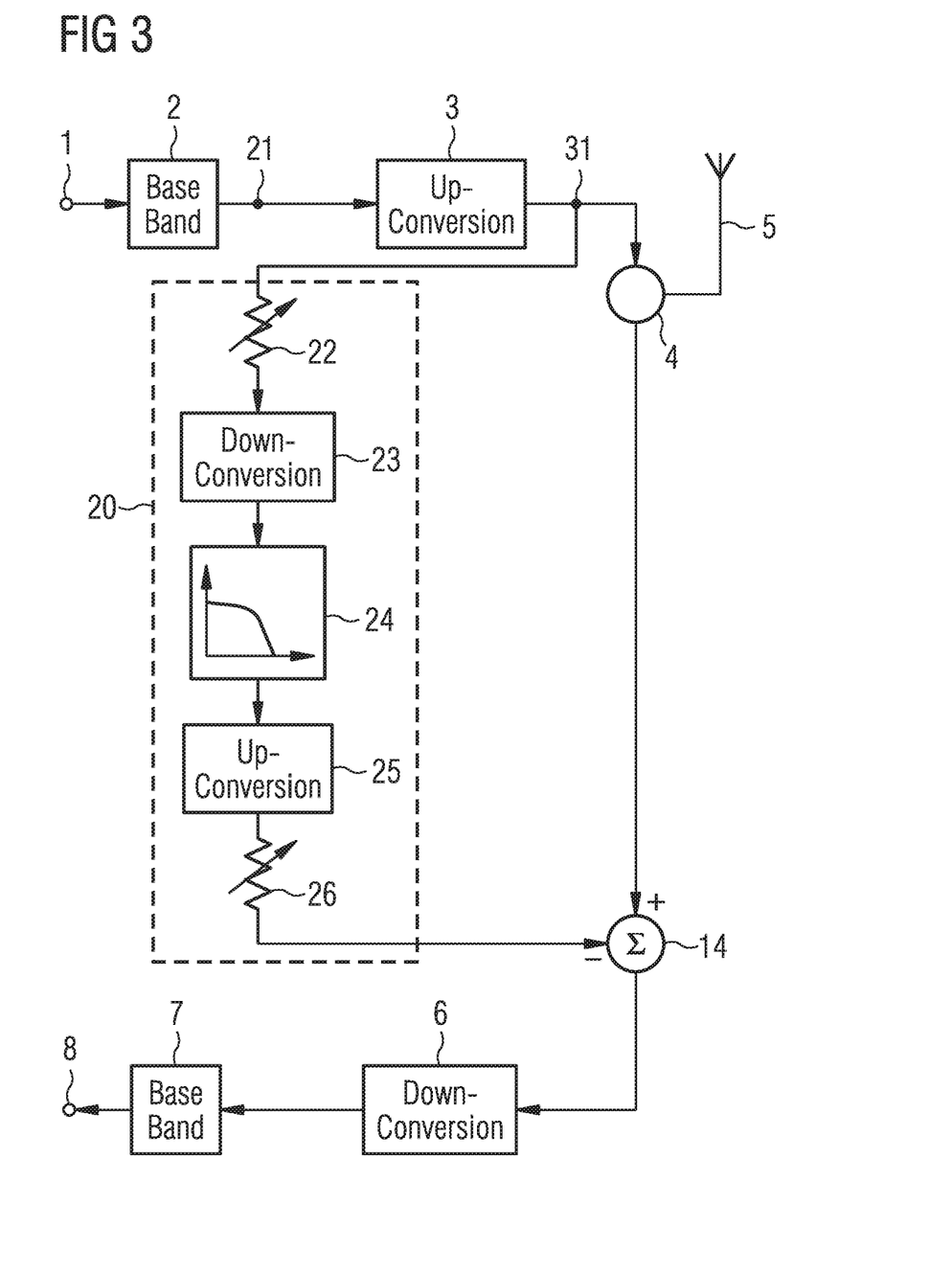
FIG. 3 shows a schematic block diagram of an exemplary radio communication device including a different electronic circuit for emulating an echo radio signal.

In an alternative implementation, the second electronic circuit used in parallel to electronic circuit 10 to emulate a second echo radio signal may have the structure of a different electronic circuit 20 as described in relation to FIG. 3, for example. Generally, the cancellation circuit 14 may cancel a plurality of emulated echo radio signals from the received radio signal independently of how each echo radio signal is emulated.

In order to cancel the self-interference caused by an echo of the transmit radio signal of the communication device, a different electronic circuit 20 as shown in FIG. 3 may be provided in the communication device to emulate an echo radio signal and subtract the emulated echo radio signal from the radio signal received from antenna 5 or circulator 4.

The electronic circuit 20 may be configured to receive a copy of the transmit radio signal emanating from up-converting circuit 3 in the transmit chain of the communication device. The copy of the transmit radio signal may be tapped from a node 31 between up-converting circuit 3 and circulator 4 in the transmit chain. The copy of the transmit radio signal may be attenuated by an attenuator, e.g. a variable attenuator, which may be implemented by an (e.g. tunable) resistor 22 or other signal dividing component or circuit. The attenuated copy of the transmit radio signal may then be processed in electronic circuit 20, as described below, and outputted to cancellation stage 14. A different portion of the processing chain of electronic circuit 20 may include an attenuator 26 in addition to, or in lieu of, attenuator 22.

In the exemplary implementation according to FIG. 3, the electronic circuit 20 may down-convert the (attenuated) copy of the transmit radio signal to baseband. Ideally, the resulting baseband signal outputted from down-converting stage 23 may be a true copy of the transmit baseband signal present at node 21. Node 21 itself may not be accessible for tapping a direct copy of the transmit baseband signal (if the transmit chain 2, 3 of the communication device is implemented as a separate integrated circuit, for example). Also, tapping the signal at node 21 may be undesirable if it is difficult to emulate the non-linearities introduced by the up-converting circuit 3 of the transmit chain, i.e. if it is difficult for the up-converting circuit 13 of electronic circuit 10 (FIG. 2) to truly emulate the up-conversion performed by up-converting circuit 3 of the transmit chain.

The electronic circuit 20 may delay the copy of the transmit baseband signal by an amount of time by low-pass filtering the copy of the transmit baseband signal. A low-pass filter 24 may include at least one capacitor and least one resistor, and at least one of those components may be tunable to vary a time constant of the low-pass filter. A second-order (or higher-order) low-pass filter including two (or more) capacitors may impose a greater delay than that achievable by a first-order low-pass filter including a single capacitor.

The output of the low-pass filter, i.e. the delayed copy of the transmit baseband signal, may be up-converted to the radio band by an up-converting stage 25 in the electronic circuit 20, in order to generate a delayed radio signal emulating an echo radio signal having a specific volume and a specific phase shift with respect to the transmit radio signal outputted from up-converting stage 3. In an ideal scenario, the up-converting stages 3 and 25 may have congruent behaviors, including congruent linearity and/or non-linearity, so that the up-converting stage 25 may deliver an ideal delayed copy of the transmit radio signal. That copy may be subtracted from the received radio signal to cancel an echo radio signal from the received radio signal.

Again, the cancellation stage 14 may be implemented as a subtracting node to subtract the emulated echo radio signal from the received radio signal arriving from circulator 4. The low-pass filter 24 may be implemented as a first-order low-pass filter including one capacitor and one resistor, or as a second (or higher) order low-pass filter including two (or more) capacitors and two (or more) resistors to achieve a wider range of delay times The attenuators 22, 26 and the low-pass filter 24 may be implemented by passive components that may perform analog signal processing without introducing distortions. Thus, the delayed radio signal outputted from up-converting stage 25 may be an ideal delayed copy of the transmit radio signal outputted from up-converting stage 3. Moreover, the components of electronic circuit 20 may lend themselves to integration on a semiconductor chip.

A second electronic circuit (not shown in FIG. 3 but reference may be had to the description of FIG. 4) may be used in parallel to the electronic circuit 20, having the same structure as electronic circuit 20 and processing a copy of the transmit radio signal tapped from node 31. However, the low-pass filter of the parallel electronic circuit may delay the regenerated copy of the transmit baseband signal by a different amount of time in order to emulate a different echo radio signal having a different phase shift with respect to the transmit radio signal. Thus, another interfering echo radio signal may be canceled from the received radio signal. As the second echo radio signal may have a different volume, the second electronic circuit may apply a different attenuation or weighting factor to the second emulated echo signal before the second emulated echo signal is subtracted from the received radio signal.

Two (or more) non-exact delayed radio signals may be generated and combined (e.g. interpolated) to emulate one actual echo radio signal. This may be another benefit of using a second (or further) electronic circuit in parallel to electronic circuit 20.

In an alternative implementation, the second electronic circuit used in parallel to electronic circuit 20 to emulate a second echo radio signal may have the structure of a different electronic circuit 10 as described in relation to FIG. 2, for example. Generally, the cancellation circuit 14 may cancel a plurality of emulated echo radio signals from the received radio signal independently of how each echo radio signal is emulated.

Figure 4:
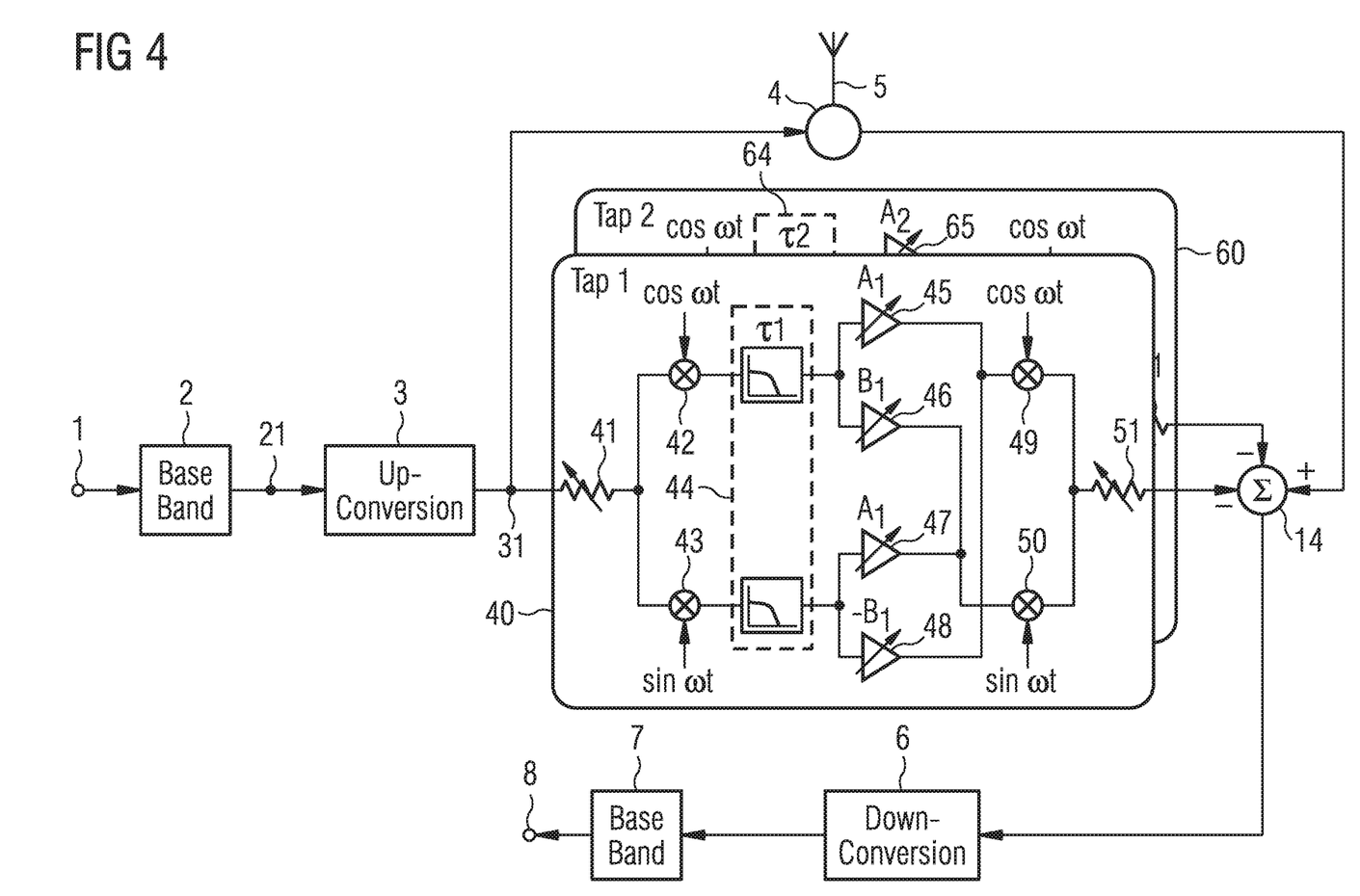
FIG. 4 shows a schematic block diagram of an exemplary radio communication device including two parallel electronic circuits for emulating two echo radio signals that may be canceled from a received radio signal.

FIG. 4 shows a schematic block diagram of an exemplary radio communication device including two parallel electronic circuits 40, 60 for emulating two different echo radio signals that may be canceled from a received radio signal.

In the example shown, electronic circuit 40 may implement the exemplary echo emulation concept described in relation to FIG. 3, i.e. electronic circuit 40 may receive a copy of the transmit radio signal by tapping the node 31 which represents an output of up-converting stage 3 in the transmit chain of the communication device. In an alternative example, the electronic circuit may implement the echo emulation concept described in relation to FIG. 2, i.e. the electronic circuit may receive a copy of the transmit baseband signal by tapping the node 21 which represents an output of baseband circuit 2 in the transmit chain of the communication device.

Referring to the example of FIG. 4, an input attenuator 41, e.g. a variable attenuator such as a tunable resistor, may attenuate the copy of the transmit radio signal to a signal level that may be handled by electronic circuit 40. The attenuated copy of the transmit radio signal may then be down-converted to baseband by mixing it with a sinusoidal signal corresponding to a carrier frequency in the radio band. According to the example shown, the down-conversion may take place in two separate down-converting stages 42, 43, for I and Q components of the transmit radio signal, by mixing the attenuated copy of the transmit radio signal with a cosine function $\cos \omega t$ and a sine function $\sin \omega t$ ($\omega=2\pi f$, with f representing the carrier frequency). The down-conversion may ideally regenerate the transmit baseband signal present at a (fictitious) node 21 between the baseband circuit 2 and up-converting stage 3 in the transmit chain of the radio communication device.

The regenerated baseband signal may be low-pass filtered in a first low-pass filter 44. The low-pass filter 44 may include a section for low-pass filtering the I component and a section for low-pass filtering the Q component of the baseband signal. Low-pass filtering may impose a desired delay on the baseband signal. Low-pass filtering may also entail a signal attenuation which may be taken into account when choosing the attenuation level achieved by other attenuators, such as attenuator 41, in the electronic circuit 40. Low-pass filter 44 may output a delayed baseband signal (decomposed into I and Q components, for example). Weighting circuits 45, 46, 47, 48 may weigh the delayed baseband signal. By choosing separate weights or attenuations (e.g. A, B, A, −B) for I/O components of the baseband signal, both scaling and phase rotation may be implemented at baseband. The weights, which may represent an additional attenuation, may also serve to adjust the volume of the emulated radio echo signal. Volume adjustment may take place automatically and periodically to adapt the emulated echo signal to varying reflective environments of the communication device in a mobile operation thereof. In an exemplary implementation, the weighting circuits may operate in the current domain (rather than voltage domain) so as to avoid the use of active components that might introduce non-linearity and, thus, signal distortion.

Up-converting stages 49, 50 may reconvert the weighted delayed baseband signal to the radio band by mixing the weighted delayed baseband signal components with a cosine function $\cos \omega t$ and a sine function $\sin \omega t$, respectively ($\omega=2\pi f$, with f representing the carrier frequency). The up-conversion of the delayed baseband signal may ideally generate an emulation of an echo radio signal having a predetermined or variable phase shift with respect to the transmit radio signal of the communication device.

Before electronic circuit 40 outputs the emulated echo signal, attenuator 51 (e.g. variable attenuator), such as a tunable resistor, may attenuate it in order to take account of the volume of the echo signal to be canceled, possibly also considering its proportion in a plurality of echo signals to be canceled.

Cancellation node 14 may use the attenuated emulated echo signal outputted from electronic circuit 40 to subtract the emulated echo signal from the radio signal received from antenna 5 or circulator 4. Thus, the down-converting stage 6 in the receive chain of the communication device may process a radio signal from which a first self-interfering echo signal has been canceled.

Two self-interfering echo signals may have different phase shifts with respect to the transmit radio signal as the second echo radio signal may have travelled a different reflection path taking a different traveling time as compared to the first echo radio signal. The second echo signal may also be canceled by emulating the second echo radio signal in a second electronic circuit 60 and by subtracting the second emulated echo signal from the received radio signal.

The second electronic circuit 60 may have a structure similar to the structure of the first electronic circuit 40 and may be arranged for parallel operation. The second electronic circuit 60 may tap a second copy of the transmit radio signal from node 31 and may process it basically in manner similar to the signal processing in the first electronic circuit 40. For example, the second electronic circuit 60 may also regenerate the transmit baseband signal by down-converting the tapped copy of the transmit radio signal. As an alternative, the second electronic circuit 60 may use a copy of the transmit baseband signal regenerated by the first electronic circuit 40.

A functional difference between the first and second electronic circuits 40, 60 may relate to the delay times imposed by the respective low-pass filters 44 and 64: Low-pass filter 64 may have a time constant $\tau 2$ different from a time constant $\tau 1$ of the low-pass filter 44. Thus, the low-pass filters 44 and 64 may delay copies of the regenerated transmit baseband signal by different amounts of time in order to emulate different phase shifts of two echo radio signals.

Another functional difference may relate to the respective weightings and attenuations applied to the two delayed copies of the transmit baseband signal in the two electronic circuits 40 and 60. As the volumes of the echo radio signals may be different (depending on their reflection paths), absolute or relative weightings may be adjusted accordingly, and may be re-adjusted dynamically during operation of a mobile communication device.

Figure 5:
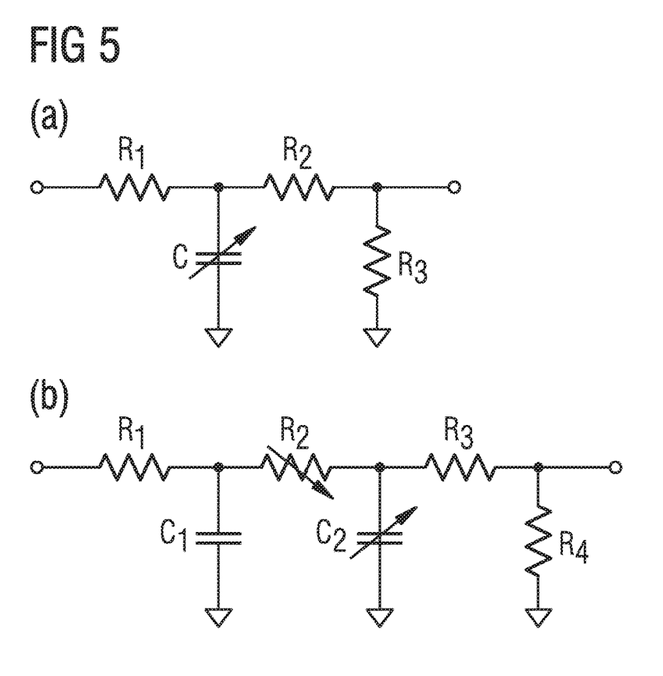
FIG. 5 shows exemplary first- and second-order low-pass filters for use in an electronic device for emulating an echo radio signal.

FIG. 5(*a*) depicts an exemplary first-order low-pass filter which may include one capacitor C and three resistors R1, R2, R3. The resistors may at the same time provide signal attenuation by forming a voltage divider. Capacitor C may be tunable to adjust the transfer function of the low-pass filter.

FIG. 5(*b*) depicts an exemplary second-order low-pass filter which may include two capacitors C1, C2 and four resistors R1, R2, R3, R4. The resistors may at the same time provide signal attenuation by forming a voltage divider.

Capacitor C2 and resistor R2 may be tunable to adjust the transfer function of the low-pass filter.

Figure 6:
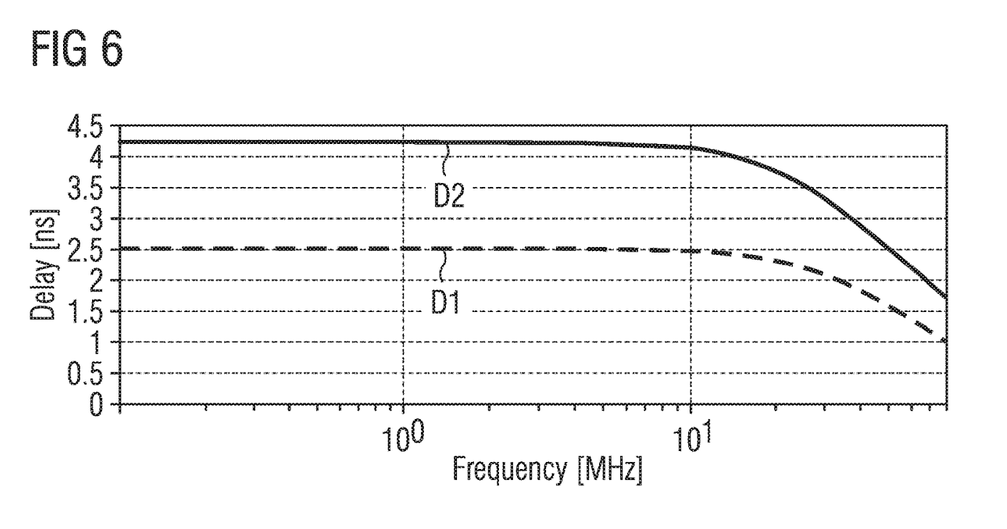
FIG. 6 plots delay times achievable by a first-order low-pass filter and a second-order low-pass filter, respectively.

FIG. 6 plots group delays, achievable by low-pass filters, over frequency. The lower graph D1 shows group delays that may be achieved by an exemplary first-order low-pass filter. In a frequency range from 0 MHz to approximately 10 MHz, the group delay may be 2.5 ns, whereas the group delay decreases for higher frequencies. The upper graph D2 shows group delays that may be achieved by an exemplary second-order low-pass filter. In a frequency range from 0 MHz to approximately 10 MHz, the group delay may be more than 4 ns, whereas the group delay decreases for higher frequencies. A low-pass filter may act as a linear phase shifter for the down-converted baseband signal which results in a constant group delay for the passband signal, group delay being the frequency derivative of the phase shift.

At least two conclusions may be drawn from the graphs plotted in FIG. 6. Firstly, to achieve greater delay values, second (or higher) order low-pass filters may be used even though they may imply greater signal attenuation. Secondly, delay values desirable for emulating echo radio signals may be achieved by low-pass filters operating at frequencies far below the radio spectrum (which may typically lie in a GHz order of magnitude). Therefore, operating on baseband signals may be rewarding in the process of canceling self-interfering radio echoes even though the cancellation process may include up- and down-conversions.

Low-pass filters may include small capacitors and may be integrated on small areas of semiconductor chips. To introduce a large delay on-chip, a tunable low-pass filter may be used. Thus, monolithic integration may be possible for electronic circuits 10, 20, 40, 60 as described in relation to FIGS. 2, 3 and 4, for example. The integration may encompass further circuits of the transmit chain and receive chain of a radio communication device. Therefore, self-interference cancellation and full-duplex communication in one radio band may be enabled even for compact hand-held devices such as mobile communication devices.

In the following, various aspects of this description will be illustrated:

Example 1 is an electronic circuit for generating a delayed radio signal for use in a radio communication device. The radio communication device is configured to provide a transmit baseband signal in a baseband, to up-convert the transmit baseband signal into a transmit radio signal in a radio band, to transmit the transmit radio signal in the radio band, and to simultaneously receive a receive radio signal in the same radio band. The electronic circuit may include a delay circuit configured to delay a copy of a transmit baseband signal by an amount of time to generate a delayed baseband signal, an up-converting circuit configured to shift a frequency spectrum of the delayed baseband signal to a radio band to generate a delayed radio signal, and an output circuit configured to output the delayed radio signal for a cancellation circuit to cancel the delayed radio signal from a receive radio signal.

In Example 2, the subject matter of Example 1 may optionally include that the delay circuit includes an input circuit configured to receive the copy of a transmit baseband signal from a transmit circuitry of the radio communication device.

In Example 3, the subject matter of Example 1 may optionally include that the delay circuit includes an input circuit configured to receive a copy of the transmit radio signal from the radio communication device, and a down-converting circuit configured to shift the frequency spectrum of the copy of the transmit radio signal from the radio band to the baseband to generate the copy of the transmit baseband signal.

In Example 4, the subject matter of any one of Examples 1 to 3 may optionally include that the delay circuit is configured to delay the copy of the transmit baseband signal by a variable amount of time to generate the delayed baseband signal.

In Example 5, the subject matter of any one of Examples 1 to 4 may optionally include that the delay circuit includes at least one low-pass filter.

In Example 6, the subject matter of Example 5 may optionally include that the delay circuit includes at least one second-order or higher-order low-pass filter.

In Example 7, the subject matter of any one of Examples 5 or 6 may optionally include that at least one of a capacitive component and a resistive component of the at least one low-pass filter is variable.

In Example 8, the subject matter of any one of Examples 1 to 7 may optionally include that the electronic circuit further includes at least one weighting circuit for weighting the delayed baseband signal.

In Example 9, the subject matter of any one of Examples 1 to 8 may optionally include that the up-converting circuit includes at least one frequency mixer for mixing the delayed baseband signal with a sinusoidal signal representing a carrier frequency corresponding to the radio band.

In Example 10, the subject matter of Example 3 may optionally include that the down-converting circuit includes at least one frequency mixer for mixing the copy of the transmit radio signal with a sinusoidal signal representing a carrier frequency corresponding to the radio band.

In Example 11, the subject matter of any one of Examples 2 or 3 may optionally include that at least one of the input circuit and the output circuit includes a signal dividing component.

In Example 12, the subject matter of any one of Examples 1 to 11 may optionally include that at least the input circuit, the delay circuit and the output circuit include passive components.

In Example 13, the subject matter of any one of Examples 1 to 12 may optionally include that the electronic circuit is integrated on a semiconductor chip.

Example 14 is a method of generating a delayed radio signal for use in a radio communication device configured to provide a transmit baseband signal in a baseband, to up-convert the transmit baseband signal into a transmit radio signal in a radio band, to transmit the transmit radio signal in the radio band, and to simultaneously receive a receive radio signal in the same radio band. The method may include delaying a copy of the transmit baseband signal by an amount of time to generate a delayed baseband signal, up-converting the frequency spectrum of the delayed baseband signal to the radio band to generate a delayed radio signal, and outputting the delayed radio signal for canceling the delayed radio signal from the receive radio signal.

In Example 15, the subject matter of Example 14 may optionally include that the copy of the transmit baseband signal is received from the radio communication device.

In Example 16, the subject matter of Example 14 may optionally include that the method further includes receiving a copy of the transmit radio signal from the radio communication device, and down-converting the frequency spectrum of the copy of the transmit radio signal from the radio band to the baseband to generate the copy of the transmit baseband signal.

In Example 17, the subject matter of any one of Examples 14 to 16 may optionally include that the copy of the transmit baseband signal is delayed by a variable amount of time to generate the delayed baseband signal.

In Example 18, the subject matter of any one of Examples 14 to 17 may optionally include that the delayed baseband signal is generated by low-pass filtering the copy of the transmit baseband signal.

In Example 19, the subject matter of any one of Examples 14 to 18 may optionally include that the delayed baseband signal is weighted by a predetermined or variable factor and the weighted delayed baseband signal is up-converted to generate the delayed radio signal.

In Example 20, the subject matter of any one of Examples 14 to 19 may optionally include that the delayed baseband signal is up-converted by mixing it with a sinusoidal signal representing a carrier frequency corresponding to the radio band.

In Example 21, the subject matter of Example 16 may optionally include that the copy of the copy of the transmit radio signal is down-converted by mixing it with a sinusoidal signal representing a carrier frequency corresponding to the radio band.

Example 22 is a radio communication device. The radio communication device may include transmit circuitry for providing a transmit baseband signal in a baseband and for up-converting the transmit baseband signal into a transmit radio signal in a radio band, a transmitter configured to transmit the transmit radio signal in the radio band, a receiver configured to simultaneously receive a receive radio signal in the same radio band, and a first electronic circuit configured to generate a first delayed radio signal. The first electronic circuit may include a first delay circuit configured to delay a first copy of the transmit baseband signal by a first amount of time to generate a first delayed baseband signal, and a first up-converting circuit configured to shift the frequency spectrum of the first delayed baseband signal to the radio band to generate the first delayed radio signal. The communication device may further include a cancellation circuit configured to receive the receive radio signal and the first delayed radio signal and to cancel the first delayed radio signal from the receive radio signal.

In Example 23, the subject matter of Example 22 may optionally include that the first delay circuit is configured to receive the first copy of the transmit baseband signal from the radio communication device.

In Example 24, the subject matter of Example 22 may optionally include that the first delay circuit is configured to receive a copy of the transmit radio signal from the transmit circuitry of the radio communication device, and that the first delay circuit includes a first down-converting circuit configured to shift the frequency spectrum of the copy of the transmit radio signal from the radio band to the baseband to generate the first copy of the transmit baseband signal.

In Example 25, the subject matter of any one of Examples 22 to 24 may optionally include that the first delay circuit is configured to delay the first copy of the transmit baseband signal by a variable amount of time to generate the first delayed baseband signal.

In Example 26, the subject matter of any one of Examples 22 to 25 may optionally include that the radio communication device further includes a second electronic circuit for generating a second delayed radio signal. The second electronic circuit may include a second delay circuit configured to delay a second copy of the transmit baseband signal by a second amount of time to generate a second delayed baseband signal, and a second up-converting circuit configured to shift the frequency spectrum of the second delayed baseband signal to the radio band to generate the second delayed radio signal. The cancellation circuit of the communication device may be configured to receive the receive radio signal, the first delayed radio signal and the second delayed radio signal and to cancel the first and second delayed radio signals from the receive radio signal.

In Example 27, the subject matter of Example 26 may optionally include that the second delay circuit is configured to receive the second copy of the transmit baseband signal from the transmit circuitry of the radio communication device.

In Example 28, the subject matter of Example 26 may optionally include that the second delay circuit is configured to receive a copy of the transmit baseband signal from the first electronic circuit.

In Example 29, the subject matter of Example 26 may optionally include that the second delay circuit is configured to receive a second copy of the transmit radio signal from the transmit circuitry of the radio communication device, and that the second delay circuit includes a second down-converting circuit configured to shift the frequency spectrum of the second copy of the transmit radio signal from the radio band to the baseband to generate the second copy of the transmit baseband signal.

In Example 30, the subject matter of any one of Examples 22 to 29 may optionally include that all circuits are integrated on a monolithic semiconductor chip.

Example 31 is a method of operating a radio communication device. The method may include providing a transmit baseband signal in a baseband and up-converting the transmit baseband signal into a transmit radio signal in a radio band, transmitting the transmit radio signal in the radio band, simultaneously receiving a receive radio signal in the same radio band, and generating a first delayed radio signal. The delayed radio signal generation may include delaying a first copy of the transmit baseband signal by a first amount of time to generate a first delayed baseband signal, and up-converting the frequency spectrum of the first delayed baseband signal to the radio band to generate the first delayed radio signal. The method may further include receiving the receive radio signal and canceling the first delayed radio signal from the receive radio signal.

In Example 32, the subject matter of Example 31 may optionally include that the first copy of the transmit baseband signal is received from transmit circuitry of the communication device.

In Example 33, the subject matter of Example 31 may optionally include that the first copy of the transmit baseband signal is generated by receiving a first copy of the transmit radio signal and by down-converting the frequency spectrum of the first copy of the transmit radio signal to the baseband.

In Example 34, the subject matter of any one of Examples 31 to 33 may optionally include that the method further includes delaying a second copy of the transmit baseband signal by a second amount of time to generate a second delayed baseband signal, up-converting the frequency spectrum of the second delayed baseband signal to the radio band to generate a second delayed radio signal, and canceling the first and second delayed radio signals from the receive radio signal received in the communication device.

In Example 35, the subject matter of Example 34 may optionally include that the second copy of the transmit baseband signal is received from transmit circuitry of the communication device.

In Example 36, the subject matter of Example 34 may optionally include that the first copy of the transmit baseband signal used in generating the first delayed radio signal is also used as the second copy of the transmit baseband signal to generate the second delayed radio signal.

In Example 37, the subject matter of Example 34 may optionally include that the second copy of the transmit baseband signal is generated by receiving a second copy of the transmit radio signal from transmit circuitry of the radio communication device and by down-converting the frequency spectrum of the second copy of the transmit radio signal from the radio band to the baseband.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes which come within the meaning and range of equivalency of the claims are therefore intended to be embraced.

What is claimed is:

1. An electronic circuit for generating a delayed radio signal for use in a radio communication device, the radio communication device configured to provide a transmit baseband signal in a baseband, to up-convert the transmit baseband signal into a transmit radio signal in a radio band, to transmit the transmit radio signal in the radio band, and to simultaneously receive a receive radio signal in the same radio band, the electronic circuit comprising:
   a delay circuit configured to delay a copy of a transmit baseband signal by an amount of time to generate a delayed baseband signal,
   an up-converting circuit configured to shift a frequency spectrum of the delayed baseband signal to a radio band to generate a delayed radio signal, and
   an output circuit configured to output the delayed radio signal for a cancellation circuit to cancel the delayed radio signal from a receive radio signal.

2. The electronic circuit of claim 1, wherein the delay circuit comprises an input circuit configured to receive the copy of a transmit baseband signal from a transmit circuitry of the radio communication device.

3. The electronic circuit of claim 1, wherein the delay circuit comprises:
   an input circuit configured to receive a copy of the transmit radio signal from the radio communication device, and
   a down-converting circuit configured to shift the frequency spectrum of the copy of the transmit radio signal from the radio band to the baseband to generate the copy of the transmit baseband signal.

4. The electronic circuit of claim 1, wherein the delay circuit is configured to delay the copy of the transmit baseband signal by a variable amount of time to generate the delayed baseband signal.

5. The electronic circuit of claim 1, wherein the delay circuit comprises at least one low-pass filter.

6. The electronic circuit of claim 1, further comprising at least one weighting circuit for weighting the delayed baseband signal.

7. The electronic circuit of claim 1, wherein the up-converting circuit comprises at least one frequency mixer for mixing the delayed baseband signal with a sinusoidal signal representing a carrier frequency corresponding to the radio band.

8. The electronic circuit of claim 3, wherein the down-converting circuit comprises at least one frequency mixer for mixing the copy of the transmit radio signal with a sinusoidal signal representing a carrier frequency corresponding to the radio band.

9. The electronic circuit of claim 1, wherein at least the input circuit, the delay circuit and the output circuit comprise passive components.

10. The electronic circuit of claim 1, wherein the electronic circuit is integrated on a semiconductor chip.

11. A method of generating a delayed radio signal for use in a radio communication device configured to provide a transmit baseband signal in a baseband, to up-convert the transmit baseband signal into a transmit radio signal in a radio band, to transmit the transmit radio signal in the radio band, and to simultaneously receive a receive radio signal in the same radio band, the method comprising:
   delaying a copy of the transmit baseband signal by an amount of time to generate a delayed baseband signal,
   up-converting the frequency spectrum of the delayed baseband signal to the radio band to generate a delayed radio signal, and
   outputting the delayed radio signal for canceling the delayed radio signal from the receive radio signal.

12. The method of claim 11, wherein the copy of the transmit baseband signal is received from the radio communication device.

13. The method of claim 11, further comprising:
   receiving a copy of the transmit radio signal from the radio communication device, and
   down-converting the frequency spectrum of the copy of the transmit radio signal from the radio band to the baseband to generate the copy of the transmit baseband signal.

14. The method of claim 11, wherein the copy of the transmit baseband signal is delayed by a variable amount of time to generate the delayed baseband signal.

15. The method of claim 11, wherein the delayed baseband signal is generated by low-pass filtering the copy of the transmit baseband signal.

16. The method of claim 11, wherein the delayed baseband signal is weighted by a predetermined or variable factor and the weighted delayed baseband signal is up-converted to generate the delayed radio signal.

17. The method of claim 11, wherein the delayed baseband signal is up-converted by mixing it with a sinusoidal signal representing a carrier frequency corresponding to the radio band.

18. The method of claim 13, wherein the copy of the transmit radio signal is down-converted by mixing it with a sinusoidal signal representing a carrier frequency corresponding to the radio band.

19. A radio communication device comprising:
   transmit circuitry for providing a transmit baseband signal in a baseband and for up-converting the transmit baseband signal into a transmit radio signal in a radio band,
   a transmitter configured to transmit the transmit radio signal in the radio band,
   a receiver configured to simultaneously receive a receive radio signal in the same radio band, and
   a first electronic circuit configured to generate a first delayed radio signal, the first electronic circuit comprising:
   a first delay circuit configured to delay a first copy of the transmit baseband signal by a first amount of time to generate a first delayed baseband signal, and a first up-converting circuit configured to shift the frequency spectrum of the first delayed baseband signal to the radio band to generate the first delayed radio signal, the communication device further comprising:

a cancellation circuit configured to receive the receive radio signal and the first delayed radio signal and to cancel the first delayed radio signal from the receive radio signal.

20. The radio communication device of claim 19, wherein the first delay circuit is configured to receive the first copy of the transmit baseband signal from the radio communication device.

21. The radio communication device of claim 19, wherein the first delay circuit is configured to receive a copy of the transmit radio signal from the transmit circuitry of the radio communication device, and wherein the first delay circuit comprises a first down-converting circuit configured to shift the frequency spectrum of the copy of the transmit radio signal from the radio band to the baseband to generate the first copy of the transmit baseband signal.

22. The radio communication device of claim 19, wherein the first delay circuit is configured to delay the first copy of the transmit baseband signal by a variable amount of time to generate the first delayed baseband signal.

23. The radio communication device of claim 19, further comprising a second electronic circuit for generating a second delayed radio signal, the second electronic circuit comprising:

a second delay circuit configured to delay a second copy of the transmit baseband signal by a second amount of time to generate a second delayed baseband signal, and a second up-converting circuit configured to shift the frequency spectrum of the second delayed baseband signal to the radio band to generate the second delayed radio signal, wherein the cancellation circuit of the communication device is configured to receive the receive radio signal, the first delayed radio signal and the second delayed radio signal and to cancel the first and second delayed radio signals from the receive radio signal.

24. The electronic circuit of claim 2, wherein at least one of the input circuit and the output circuit comprises a signal dividing component.

25. The electronic circuit of claim 1, wherein the delay circuit comprises an input circuit configured to be coupled to a transmit circuitry of the radio communication device, and wherein the copy of the transmit baseband signal is generated from a node in the transmit circuitry.

* * * * *